(12) United States Patent
Halko et al.

(10) Patent No.: US 6,441,098 B2
(45) Date of Patent: Aug. 27, 2002

(54) LOW HARDNESS, RESILIENT GOLF PUTTER INSERT

(75) Inventors: Roman D. Halko, Mansfield, MA (US); Derek A. Ladd, Vista, CA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/855,699

(22) Filed: May 16, 2001

Related U.S. Application Data

(60) Provisional application No. 60/206,556, filed on May 24, 2000.

(51) Int. Cl.$^7$ .............................. A63B 53/04; C08L 9/00
(52) U.S. Cl. .................... 525/261; 525/274; 525/332.6; 473/329; 473/332; 473/340; 473/349
(58) Field of Search ............................... 525/261, 274, 525/332.6; 473/329, 332, 340, 349

(56) References Cited

U.S. PATENT DOCUMENTS

| | | | |
|---|---|---|---|
| 2,201,638 A | 5/1940 | Theibault, Sr. .............. 273/77 |
| 3,239,228 A | 3/1966 | Crompton, III ............. 273/218 |
| 3,572,721 A | 3/1971 | Harrison et al. ............ 372/218 |
| 3,572,722 A | 3/1971 | Harrison et al. ............ 273/218 |
| 3,992,014 A | 11/1976 | Retford ...................... 273/218 |
| 4,692,497 A | 9/1987 | Gendreau et al. ........... 525/263 |
| 4,931,376 A | 6/1990 | Ikematsu et al. ............ 526/164 |
| 4,971,329 A | 11/1990 | Llort et al. ................. 273/218 |
| 5,252,652 A | 10/1993 | Egashira et al. ............ 524/392 |
| 5,332,214 A | 7/1994 | Tucker, sr. ................... 273/78 |
| 5,421,580 A | 6/1995 | Sugimoto et al. ........... 273/227 |
| 5,460,337 A | 10/1995 | Schmidt et al. ............. 273/173 |
| 5,485,997 A | 1/1996 | Schmidt et al. ............... 273/78 |
| 5,516,847 A | 5/1996 | Sullivan et al. ............. 525/221 |
| 5,524,331 A | 6/1996 | Pond ......................... 29/527.4 |
| 5,542,677 A | 8/1996 | Sullivan et al. ............. 473/385 |
| 5,575,472 A | 11/1996 | Magerman et al. ........... 29/530 |
| 5,605,510 A | 2/1997 | Schmidt et al. ............. 473/251 |
| 5,674,132 A | 10/1997 | Fisher ........................ 473/290 |
| 5,690,562 A | 11/1997 | Sturm ........................ 473/340 |
| 5,697,856 A | 12/1997 | Moriyama et al. .......... 473/374 |
| 5,718,644 A | 2/1998 | Donofrio .................... 473/340 |
| 5,816,944 A | 10/1998 | Asakura et al. ............. 473/372 |
| 5,824,746 A | 10/1998 | Harris et al. ................ 525/196 |
| 5,842,935 A | 12/1998 | Nelson ........................ 473/342 |
| 5,921,871 A | 7/1999 | Fisher ........................ 473/329 |
| 5,924,939 A | 7/1999 | Grace et al. ................ 473/324 |
| 5,931,743 A | 8/1999 | Baker et al. ................ 473/313 |
| 5,944,619 A | 8/1999 | Cameron .................... 473/332 |
| 6,030,294 A | 2/2000 | Shira ......................... 473/342 |

FOREIGN PATENT DOCUMENTS

| | | |
|---|---|---|
| EP | 0 577 058 A1 | 1/1994 |
| GB | 1168609 | 10/1969 |
| GB | 1209032 | 10/1970 |
| GB | 2321021 A | 7/1998 |
| WO | WO 00/20076 | 4/2000 |

*Primary Examiner*—David J. Buttner
(74) *Attorney, Agent, or Firm*—Swidler Berlin Shereff Friedman, LLP

(57) ABSTRACT

An insert for a golf club, and method of forming said insert, comprising a material formed from the conversion reaction of an amount of polybutadiene, a free radical source, and a cis-to-trans catalyst, which reaction occurs at a sufficient temperature to form a polybutadiene reaction product which comprises an amount of trans-polybutadiene greater than the amount of trans-polybutadiene present before the conversion reaction. Further, a golf club having a toe and an opposite heel, a sole portion, and an opposite top portion, a forwardly facing exposed strike face and an opposite rearwardly facing exposed back face portion, comprising a recess defined in the strike face, the recess having a bottom surface spaced from the back face portion and a side wall surface extending between the bottom surface and the strike face for disposing the insert.

42 Claims, 4 Drawing Sheets

LOW HARDNESS, RESILIENT GOLF PUTTER INSERT

CROSS-REFERENCE TO RELATED APPLICATION(S)

This application claims priority to U.S. Provisional Application No. 60/206,556, filed May 24, 2000.

FIELD OF THE INVENTION

The present invention relates to golf clubs and, more particularly, to a golf club that has an insert on the strike surface of the club formed from the conversion reaction of an amount of polybutadiene, a free radical source, and a cis-to-trans catalyst at a sufficient reaction temperature to form a polybutadiene reaction product.

BACKGROUND OF THE INVENTION

Golf clubs have long been developed to improve the "touch" and "feel" of the club, most particularly with, but not limited to, the clubs used on and around the green, such as a putter. One approach to improve the touch and feel of a club is to modify either the grip, the shaft, or the head of the golf club, in particular, the strike face of the head. For example, modifications to the club head could include an insert that is placed on the club head strike surface to affect the impact of the club with the golf ball and to improve the sensory feedback to the golfer during and subsequent to impact.

A number of club face insert materials have been employed by golf club manufacturers in an effort to improve the touch and feel of golf clubs, such as metals, plastics, alloys, rubbers, and ceramics. A few exemplary such references are discussed below.

U.S. Pat. No. 5,332,214 discloses a golf putter having an elastomeric striking face secured to a support member and a weight within a recessed cavity. The preferred elastomeric material is HYTREL®, a polyester elastomer commercially available from E.I. DuPont de Nemours & Co. of Wilmington, Del.

U.S. Pat. No. 5,485,997 discloses a putter head having a recess in the front face, the recess containing a face plate constructed of a non-metallic material, such as an elastomer, a synthetic resin, or glass.

U.S. Pat. No. 5,524,331 discloses a method for manufacturing a golf club head including a recess containing a curable, non-metal insert, such as a void-free epoxy impregnated carbon fiber sheet, ambient temperature resins, UV curable resins, thermosetting polymers, and/or thermoplastic polymers.

U.S. Pat. No. 5,575,472 discloses a golf putting head having a recessed cavity on its front face that includes a raised perimeter bead. An insert is cast within the cavity and the club face is finished to provide a smooth planar surface. The insert material is preferably a polymeric or elastomeric material, ambient temperature resins, UV curable resins, thermosetting polymers, and/or thermoplastic polymers.

U.S. Pat. Nos. 5,605,510 and 5,460,377 are directed to a golf putter having a non-metallic face, typically consisting of synthetic resin or lightweight plastic.

U.S. Pat. No. 5,674,132 discloses a golf club having a resilient insert comprising one or more laminations. Preferably, the insert is made of a synthetic polymer material, such as solid polyurethane, having a hardness in the range of 70 Shore A to 70 Shore D.

U.S. Pat. No. 5,690,562 discloses a golf putter head having an insert in the front face, the insert being constructed of an elastomeric material having a Durometer value of at least about 60 Shore D.

U.S. Pat. No. 5,718,644 discloses an insert member for a golf putter, the insert comprising a regular, elongated curved surface, such as an arc section of a cylinder. The insert is comprised of titanium, titanium alloy, anodized aluminum, or high strength plastic.

U.S. Pat. No. 5,842,935 discloses a golf putter head that includes a low density insert disposed in a cavity formed in a body. The insert is preferably formed of polyurethane having a Shore D hardness of 65.

U.S. Pat. No. 5,921,871 discloses a golf putter having a resilient insert having a controlled rebound factor fitted into a wedge-shaped recess in the face of the putter head. The insert pad is preferably made of a synthetic polymer material, such as polyurethane having a hardness in the range of 70 Shore A to 80 Shore D.

U.S. Pat. No. 5,924,939 discloses a golf club head having a two-layered insert preferably comprising a thermoset rubber, such as one formed from a cured mixture comprising a polymer blend, a metal salt of an unsaturated carboxylic acid, a free radical initiator, and silica.

U.S. Pat. No. 5,931,743 discloses a club head for a golf club having a resilient member on the front face, the resilient member preferably comprising a polyurethane elastomer exhibiting zero compression for imparting top spin to a golf ball.

U.S. Pat. No. 6,030,294 discloses a method of making a golf club head or an insert for a golf club head which comprises preparing a porous base selected from the group consisting of metals, metal alloys, and cements, and coating at least the face of the base with a plastic material, such as monomers, polymers, urethanes, epoxies, lacquers, paints, and the like.

PCT Publication No. WO 00/20076 discloses a golf club head having a polyether block amide insert that has a Shore A hardness of at least 90 and a rebound factor of at least 60%.

Another resilient yet durable material, commonly used in the various layers and cores of golf balls, is polybutadiene and, in particular, polybutadiene having a high cis-isomer polybutadiene concentration. In general, various polybutadiene compositions are used in golf balls, and some of these core compositions are discussed below.

U.S. Pat. No. 3,239,228 discloses a solid golf ball having a core molded of polybutadiene rubber with a high sulfur content, and a cover. The polybutadiene content of the core is stereo-controlled to the configuration 25–100 percent cis- and 0–65 percent trans-1,4-polybutadiene, with any remainder having a vinyl configuration of polybutadiene. A preferred embodiment of the polybutadiene golf ball core contains 35 percent cis-, 52 percent trans-, and 13 percent vinyl-polybutadiene.

U.S. Pat. Nos. 3,572,721 and 3,572,722 disclose a solid, one- or two-piece golf ball, with the two-piece ball having a core and a cover. The cover material can include any one of a number of materials, or blends thereof, known to those of ordinary skill in the art, including trans-polybutadiene which may be present in an amount from at least 90 percent, with the remainder being the cis- and/or vinyl configuration.

U.S. Pat. No. 3,992,014 discloses a one-piece, solid golf ball. The golf ball material is typically polybutadiene, with a stereo-configuration selected to be at least 60 percent cis-polybutadiene, with the remaining 40 percent being the trans-polybutadiene and/or 1,2-polybutadiene (vinyl) isomers.

U.S. Pat. No. 4,692,497 discloses a golf ball and material thereof formed by curing a diene polymer including polybutadiene and a metal salt of an alpha, beta ethylenically unsaturated acid using at least two free radical initiators.

U.S. Pat. No. 4,931,376 discloses a process for producing butadiene polymers for use in various applications, including golf ball cover materials. One embodiment of the invention employs a blended polymeric resin material, including at least 30 percent by weight of a trans-polybutadiene polymer as a golf ball cover on a two-piece ball. In a preferred embodiment, the golf ball cover material contains a blend including 30 to 90 percent by weight of a trans-polybutadiene polymer.

U.S. Pat. No. 4,971,329 discloses a solid golf ball made from a polybutadiene admixture of cis-1,4 polybutadiene and 1,2 polybutadiene, a metal salt of an unsaturated carboxylic acid, an inorganic filler, and a free radical initiator. The admixture has about 99.5 percent to about 95 percent by weight of cis-1,4 polybutadiene and about 0.5 percent to about 5 percent by weight of 1,2 polybutadiene.

U.S. Pat. No. 5,252,652 discloses a one-piece or multi-layered golf ball core with improved flying performance from a rubber composition comprising a base rubber, preferably 1,4-polybutadiene with a cis-content of at least 40 mole percent, an unsaturated carboxylic acid metal salt, an organic peroxide, and an organic sulfur compound and/or a metal salt thereof. The organic sulfur compound and/or a metal salt is typically present in an amount from about 0.05 to 2 parts per hundred by weight and the organic peroxide is typically present in an amount from about 0.5 to 3 parts per hundred by weight of the total polymer component.

U.S. Pat. No. 5,421,580 discloses a wound golf ball having a liquid center contained in a center bag, a rubber thread layer formed on the liquid center, and a cover over the wound layer and liquid center. The cover material can include any one of a number of materials, or blends thereof, known to those of ordinary skill in the art, including trans-polybutadiene and/or 1,2-polybutadiene (vinyl), such that the cover has a JIS-C hardness of 70–85; preferred trans-percentages are not disclosed.

U.S. Pat. No. 5,697,856 discloses a solid golf ball having a core and a cover wherein the core is produced by vulcanizing a base rubber composition containing a butadiene rubber having a cis-polybutadiene structure content of not less than 90 percent before vulcanization. The amount of trans-polybutadiene structure present after vulcanization is 10 to 30 percent, as amounts over 30 percent are alleged to detrimentally result in cores that are too soft with deteriorated resilience performance, and to cause a decrease in golf ball performance. The core includes a vulcanizing agent, a filler, an organic peroxide, and an organosulfur compound.

U.S. Pat. No. 5,816,944 discloses a solid golf ball having a core and a cover wherein the core has a JIS-C hardness of 50 to 80 and the cover has a Shore-D hardness of 50 to 60. The core material includes vulcanized rubber, such as cis-polybutadiene, with a crosslinker, an organic peroxide, an organosulfur compound and/or a metal-containing organo-sulfur compound, and a filler.

European Patent No. 0 577 058 discloses a golf ball containing a core and a cover that is formed as two separate layers. The inner layer of the cover is molded over the core and is formed from ionomer resin. The outer layer of the cover is molded over the inner layer and is formed from a blend of natural or synthetic balata and a crosslinkable elastomer, such as polybutadiene. In one embodiment of the outer layer of the cover, the elastomer is 1,4-polybutadiene having a cis-structure of at least 40 percent, with the remaining 60 percent being the trans-isomer. A preferred embodiment contains a cis-structure of at least 90 percent and more preferably, a cis-structure of at least 95 percent.

British Patent No. 1,168,609 discloses a molding composition from which improved golf ball cores can be molded and which contains cis-polybutadiene as a basic polymer component. The core polymer component typically includes at least 60 percent cis-polybutadiene, with the remainder being either the trans- or vinyl-forms of polybutadiene. In a preferred embodiment, the core polybutadiene component contains 90 percent cis-configuration, with the remaining 10 percent being either the trans- or vinyl-configurations of 1,4-polybutadiene.

British Patent No. 1,209,032 discloses a two- or three-piece golf ball having a core and a cover. The core or cover material can be any material capable of being crosslinked. In particular, the material can be a polymer or a copolymer of butadiene or isoprene. Preferably, the polymer component is polybutadiene having a cis content of greater than 50 percent by weight.

British Patent No. 2,321,021 discloses a solid golf ball having a core and a cover formed on the core and having a two-layered cover construction having an inner cover layer and an outer cover layer. The outer cover layer is comprised of a rubber composite that contains 0.05 to 5 parts by weight of an organic sulfide compound. The core rubber composition comprises a base rubber, preferably 1,4-polybutadiene having a cis-content of at least 40 percent by weight, a crosslinking agent, a co-crosslinking agent, an organic sulfide, and a filler.

Additionally, conventional polymers that have a high percentage of the trans-polybutadiene conformation, such as DIENE® 35NF, from Firestone Corp., that has 40 percent cis-isomer and 50 percent trans-polybutadiene isomer, and mixtures of high-cis- and high-trans-polybutadiene isomers, such as CARIFLEX® BR1220, from Shell Corporation, and FUREN® 88, from Asahi Chemical Co., respectively, typically do not yield high resilience values.

Thus, it is desired that the present invention provide an improved golf club head, for example, with better touch and feel as a result of modifying the strike face of the golf club head.

SUMMARY OF THE INVENTION

The invention relates to a golf club having a toe and an opposite heel, a sole portion and an opposite top portion, a forwardly facing exposed strike face, an opposite rearwardly facing exposed back face portion, a hosel, and a shaft, including a recess defined in the strike face, said recess having at least a bottom surface spaced from the back face portion and a side wall surface extending between the bottom surface and the strike face; and an insert located in the recess formed of a first vibration dampening material including an insert material formed from the conversion reaction of a resilient polymer having sufficient amounts of polybutadiene, a free radical source, and a cis-to-trans catalyst, which reaction occurs at a sufficient temperature to form a polybutadiene reaction product which comprises an amount of trans-polybutadiene isomer greater than the amount of trans-polybutadiene isomer present before the conversion reaction.

In one embodiment, the insert material has a first dynamic stiffness measured at −50° C. that is less than about 130 percent of a second dynamic stiffness measured at 0° C. In another embodiment, the insert has a midpoint having a first amount of trans-polybutadiene and a surface having a second amount of trans-polybutadiene, wherein the first amount is at least about 6 percent less than the second amount.

In one embodiment, the cis-to-trans catalyst includes a Group VIA element, an inorganic sulfur compound, an organosulfur compound, an aromatic organometallic compound, a metal-organosulfur compound, or an aromatic organic compound, or a combination thereof. In one preferred embodiment, the cis-to-trans catalyst includes a Group VIA element, an organosulfur component, an inorganic sulfide, or a combination thereof. Typically, the cis-to-trans catalyst is present in an amount from about 0.01 to about 25 parts per hundred of resilient polymer. In another preferred embodiment, the cis-to-trans catalyst is present in an amount from about 0.01 to about 15 parts per hundred of the total resilient polymer component. In yet another preferred embodiment, the cis-to-trans catalyst is present in an amount from about 0.05 to about 5 parts per hundred of polybutadiene.

In one preferred embodiment, the insert material includes less than about 7 percent vinyl isomer content based on the total polybutadiene. In a more preferred embodiment, the insert material includes less than about 4 percent vinyl isomer. In one more preferred embodiment, the insert material includes less than about 2 percent vinyl isomer.

In one embodiment, the club includes a plurality of apertures extending from said back face portion toward the recess and a second vibration dampening material located in at least one of the apertures. In another embodiment, the insert further includes a back face and the back face is spaced from said bottom surface of the recess to define a gap. In one embodiment, the club further includes a second vibration dampening material located within the gap. In a preferred embodiment, the second vibration material is disposed within at least a majority, or preferably all, of the apertures. In yet another preferred embodiment, the second vibration dampening material includes the insert material.

The invention also relates to a golf club insert including an insert material formed from the conversion reaction of a sufficient amount of a resilient polymer including polybutadiene, a free radical source, and a cis-to-trans catalyst, which reaction occurs at a sufficient temperature to form a polybutadiene reaction product which comprises an amount of trans-polybutadiene greater than the amount of trans-polybutadiene present before the conversion reaction. In one embodiment, the insert material has a first dynamic stiffness measured at −50° C. that is less than about 130 percent of a second dynamic stiffness measured at 0° C.

In one embodiment, the insert has a midpoint having a first amount of trans-polybutadiene and a surface having a second amount of trans-polybutadiene, wherein the first amount is at least about 6 percent less than the second amount.

In another embodiment, the cis-to-trans catalyst includes a Group VIA element, an inorganic sulfur compound, an organosulfur compound, an aromatic organometallic compound, a metal-organosulfur compound, an aromatic organic compound, or a combination thereof. In one preferred embodiment, the cis-to-trans catalyst includes a Group VIA element, an organosulfur component, an inorganic sulfide, or a combination thereof. One preferred cis-to-trans catalyst includes 4,4'-ditolyl disulfide. The cis-to-trans catalyst is typically present in amounts similar to those noted above.

The insert material preferably includes less than about 7 percent vinyl isomer content based on the total polybutadiene. In one preferred embodiment, the insert material includes less than about 4 percent vinyl isomer. In another preferred embodiment, the insert material includes less than about 2 percent vinyl isomer.

The invention also relates to a method for forming a golf club insert which includes combining a cis-to-trans catalyst, a free radical source, and a first resilient polymer component comprising a polybutadiene component having cis-isomer present in an amount greater than about 70 percent of the total polymer component; converting a portion of the first resilient polymer component to a second resilient polymer component at a temperature sufficient to convert at least a portion of the cis-polybutadiene isomer to a trans-polybutadiene isomer; and forming the second resilient polymer component into at least a portion of the golf club insert.

In one preferred embodiment, the portion of the second resilient polymer component is formed into a substantially rectangular shape. In another embodiment, the portion of the second resilient polymer component is formed by molding the insert in situ on a golf club. In one embodiment, the polybutadiene component includes a cis-polybutadiene isomer present in an amount of at least about 80 percent of the total first resilient polymer component. It is also possible to combine a density-modifying filler, a crosslinking agent, or both with the insert material.

In one embodiment, the insert has a midpoint having a first amount of trans-polybutadiene and a surface having a second amount of trans-polybutadiene, wherein the first amount is at least about 7 percent less than the second amount. In another embodiment, the second amount of trans-polybutadiene component is selected to include a vinyl polybutadiene component present in an amount of less than about 7 percent of the total resilient polymer component.

The method can use similar types and amounts of cis-to-trans catalyst as noted above for the insert and club embodiments. In one embodiment, the converting takes about 2 to 18 min. In a preferred embodiment, the converting includes a single-step compression molding of the first resilient polymer component to convert the first resilient polymer component to the second resilient polymer in about 3 to 15 minutes; and the forming includes shaping the second resilient polymer component into a substantially rectangular shape. In one preferred embodiment, the converting and forming are substantially simultaneous.

BRIEF DESCRIPTION OF THE DRAWINGS

Further features and advantages of the invention can be ascertained from the following detailed description that is provided in connection with the drawings described below.

DEFINITIONS

Figure 1:
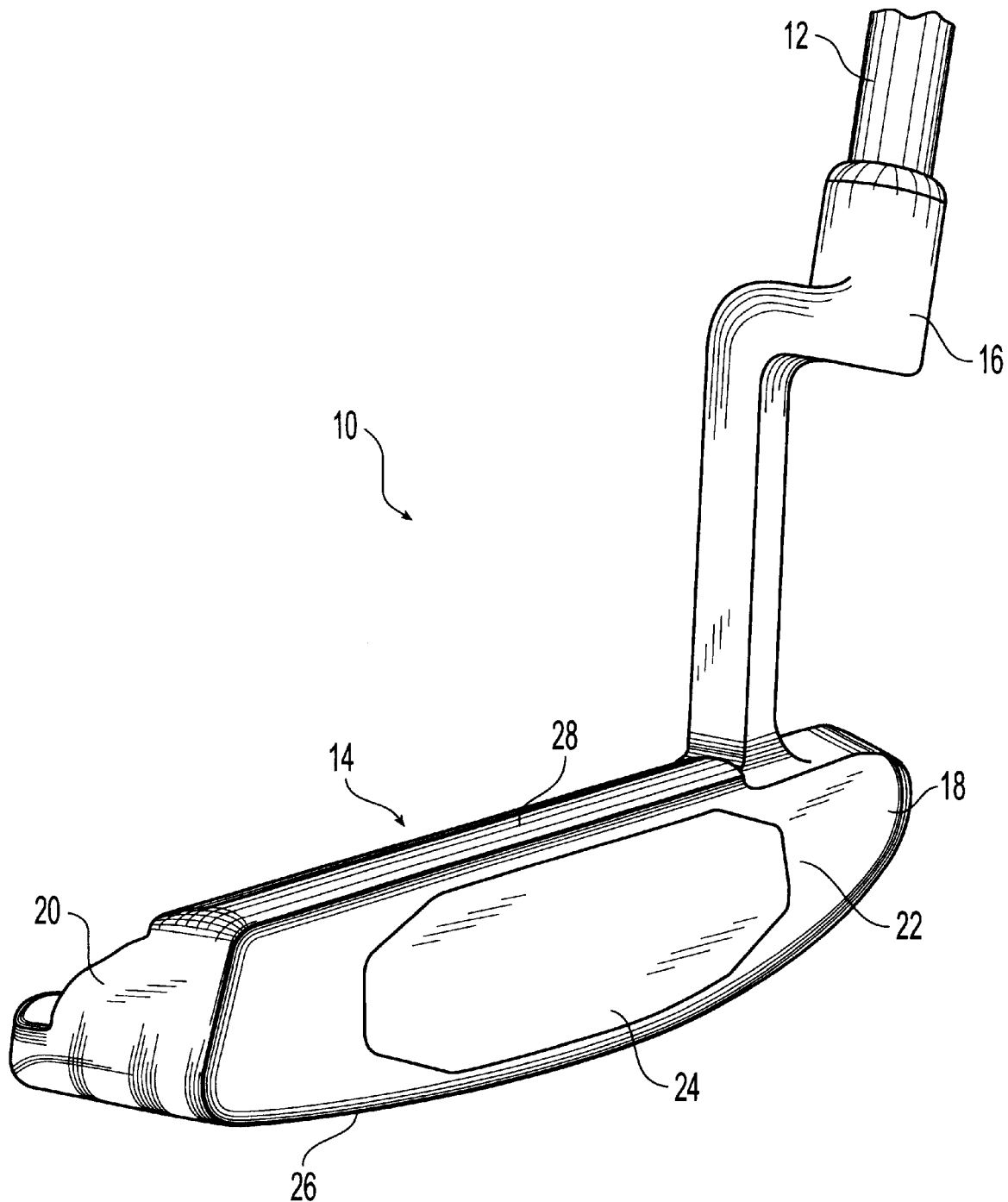
FIG. 1 is a perspective view of one embodiment of a club head according to the present invention having an insert formed of a polybutadiene reaction product.

The term "about," as used herein in connection with one or more numbers or numerical ranges, should be understood to refer to all such numbers, including all numbers in a range.

As used herein, "cis-to-trans catalyst," means any component or a combination thereof that will convert at least a portion of cis-isomer polybutadiene to trans-isomer polybutadiene at a given temperature.

As used herein, the term "active ingredients" is defined as the specific components of a mixture or blend that are essential to the chemical reaction.

As used herein, substituted and unsubstituted "aryl" groups means a hydrocarbon ring bearing a system of conjugated double bonds, typically comprising 4n+2 π (pi) ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include nitro groups.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the terms "Group VIA component" or "Group VIA element" mean a component that includes a sulfur component, a selenium component, or a tellurium component, or a combination thereof.

As used herein, the term "molecular weight" is defined as the absolute weight average molecular weight.

As used herein, the term "parts per hundred", also known as "phr", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein, the term "substantially free" means less than about 5 weight percent, preferably less than about 3 weight percent, more preferably less than about 1 weight percent, and most preferably less than about 0.01 weight percent.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

DETAILED DESCRIPTION OF THE INVENTION

The present invention relates to an insert for a golf club, such as a putter, that includes a reaction product of a cis-to-trans catalyst, a resilient polymer component having polybutadiene, a free radical source, and optionally, a crosslinking agent, a filler, or both. The invention also includes a method to convert the cis-isomer of polybutadiene to the trans-isomer during a molding cycle and to thereby form a golf club insert. Various combinations of polymers, cis-to-trans catalysts, fillers, crosslinkers, and a source of free radicals, may be used to form a suitable club insert according to the invention. To obtain a higher resilience and lower compression, a high-molecular weight polybutadiene having a cis-isomer content preferably greater than about 70 percent is at least in part converted to increase the percentage of trans-isomer content at any point the insert or portion thereof. Preferably, the trans-isomer context is increased throughout substantially all of the insert or portion thereof, and more preferably throughout the entire insert during the molding cycle. More preferably, the cis-polybutadiene isomer is initially present in an amount of greater than about 80 percent of the total polybutadiene content. Most preferably, the cis-polybutadiene isomer is initially present in an amount of greater than about 96 percent of the total polybutadiene content.

Without wishing to be bound by any particular theory, it is believed that a low amount of 1,2-polybutadiene ("vinylpolybutadiene") is desired in the initial polybutadiene and the reaction product. Typically, the vinyl polybutadiene isomer content is less than about 7 percent of the total polybutadiene isomers. Preferably, the vinyl polybutadiene isomer content is less than about 4 percent of the total polybutadiene isomers. More preferably, the vinyl polybutadiene isomer content is less than about 2 percent of the total polybutadiene isomers. Without wishing to be bound by any particular theory, it is also believed that the resulting mobility of the combined cis- and trans-isomers of the polybutadiene backbone is responsible for the lower modulus and higher resilience of the reaction product and club inserts including the same.

The polybutadiene should be present in an amount of greater than about 50 phr of the polymer. Preferably, the polybutadiene is present in an amount of greater than about 80 phr, and more preferably, greater than about 95 phr of the polymer used to form the insert.

To produce a polymer reaction product that exhibits the higher resilience and lower modulus (low compression) properties that are desirable and beneficial to the characteristics of golf club inserts, high-molecular-weight cis-1,4-polybutadiene, preferably may be converted to the trans-isomer during the molding cycle. The initial polybutadiene material typically has an average molecular weight of greater than about 200,000. Preferably, the polybutadiene molecular weight is greater than about 250,000, more preferably from about 300,000 to 500,000. Without wishing to be bound by any particular theory, it is believed that the cis-to-trans catalyst in conjunction with the free radical source, acts to convert a percentage of the cis-isomers of the polybutadiene polymer to the trans-conformation. The cis-to-trans conversion requires the presence of a cis-to-trans catalyst, such as Group VIA element, an organosulfur or metal-containing organosulfur compound, a substituted or unsubstituted aromatic organic compound, an inorganic sulfide compound, or mixtures thereof. The cis-to-trans catalyst must be capable of converting a position of cis-isomer to trans-isomer in the polybutadiene.

Suitable substituted or unsubstituted aromatic organic components that can be included in the cis-to-trans catalyst include, but are not limited to, components having the formula $(R_1)_x$—$R_3$—M—$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof, mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. Several preferred aromatic components for use in the cis-to-trans catalyst are those having the formula:

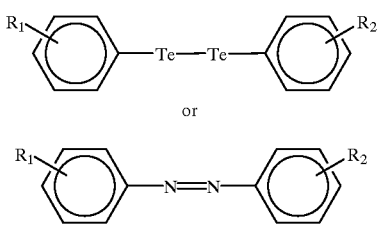

In the first of these two structures, selenium may be used in place of the tellurium if desired. Thus, in the most preferred embodiments, $R_3$ and $R_4$ are each a $C_6$ aryl group and M includes either an azo group, tellurium, or selenium.

Suitable organosulfur components that can optionally be included in the cis-to-trans catalyst include, but are not limited to, diphenyl disulfide; 4,4'-ditolyl disulfide; diphenyl acetylene; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphthyl) disulfide; 2,2'-bis(1-acetylnaphthyl)disulfide; or a mixture thereof. Preferred organosulfur components include diphenyl disulfide, 4,4'-ditolyl disulfide ("DTDS"), or a mixture thereof. The most preferred organosulfur component is DTDS. These suitable organosulfur components are preferably substantially free of metal. The organosulfur component, when included in the cis-to-trans catalyst, is preferably present in an amount sufficient to produce the reaction product so as to contain at least about 12 percent trans-polybutadiene isomer, but typically is greater than about 32 percent trans-polybutadiene isomer based on the total resilient polymer component. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. The cis-to-trans catalyst may thus be a blend, such as of a Group VIA element with any of the other cis-to-trans catalysts discussed herein, e.g., an aromatic organic compound, an organosulfur compound, an inorganic sulfide compound, or a combination thereof.

Elemental sulfur and polymeric sulfur are commercially available from, e.g., Elastochem, Inc. of Chardon, Ohio. Exemplary sulfur catalyst compounds include PB(RM-S)-80® elemental sulfur and PB(CRST)-65® polymeric sulfur, each of which is available from Elastochem, Inc. An exemplary tellurium catalyst under the tradename TELLOY® and an exemplary selenium catalyst under the tradename VAN-DEX® are each commercially available from R T Vanderbilt of Norwalk, Conn. It is to be understood that when an elemental or polymeric sulfur component is selected as the cis-to-trans catalyst, an accelerator may be included in the catalyst component. Suitable accelerators include, but are not limited to, sulfonamide, such as N-oxydiethylene 2-benzothiazole-sulfonamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

The cis-to-trans catalyst is preferably present in an amount from about 0.01 to 25 parts per hundred of the total resilient polymer component, i.e., initial high cis-polybutadiene isomer material. More preferably, the cis-to-trans catalyst is present in an amount from about 0.01 to 5, parts per hundred of the total resilient polymer component. Most preferably, the cis-to-trans catalyst is present in an amount from about 0.05 to 3 parts per hundred of the total resilient polymer component. The cis-to-trans catalyst is typically present in an amount sufficient to produce the reaction product so as to increase the trans-polybutadiene isomer content to preferably contain from about 5 percent to 80 percent trans-isomer polybutadiene based on the total resilient polymer component. In one embodiment, the reaction product includes 32 to 70 percent trans-polybutadiene ionomers.

The measurement of trans-isomer content of polybutadiene referred to herein is accomplished as follows. Calibration standards are prepared using at least two polybutadiene rubber samples of known trans-content, e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a commercially available Fourier Transform Infrared ("FTIR") spectrometer equipped with a photoacoustic ("PA") detector, a PA spectrum of each standard was obtained using the following instrument parameters: scan at speed of 2.5 KHz (0.16 cm/sec optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 $cm^{-1}$ to 4000 $cm^{-1}$ with a sensitivity setting of 1.

The cis-, trans-, and vinyl-polybutadiene peaks found between 600 $cm^{-1}$ and 1100 $cm^{-1}$ from the PA spectra can be integrated. The area under the trans-polybutadiene peaks as a fraction of the total area under the three isomer peaks can then be determined to construct a calibration curve of the trans-polybutadiene area fraction versus the actual trans-polybutadiene content. The correlation coefficient ($R^2$) of the resulting calibration curve must be a minimum of 0.95.

A PA spectrum is obtained using the parameters described above for the unknown core material at the point of interest (e.g., the surface or center of the core) by filling the PA detector with a sample containing a freshly cut, uncontaminated surface free of foreign matters such as mold release and the like. The trans-polybutadiene area fraction of the unknown is analyzed to determine the actual trans-isomer content from the calibration curve. An increase in the trans-content any where in the article being manufactured or tested should be understood herein to refer to the trans- at any point in the article.

In one known circumstance when barium sulfate is included as a filler, the above method for testing trans-content may be less accurate. Thus, an additional or alternative test of the trans-content of polybutadiene is as follows. Calibration standards are prepared using at least two polybutadienes of known trans-content (e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a Fourier Transform Raman ("FT-Raman") spectrometer equipped with a near-infrared laser, a Stokes Raman spectrum should be obtained from each standard using the following instrument parameters: sufficient laser power to obtain a good signal to noise ratio without causing excessive heating or fluorescence (typically about 400 mW to 800 mW is suitable); a resolution of 2 $cm^{-1}$; over a Raman shift spectral range of about 400 to 4000 $cm^{-1}$; and co-adding at least 300 scans.

A calibration curve may be constructed from the data generated above, using a chemometrics approach and software such as PLSplus/IQ® from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 $cm^{-1}$ to 1700 $cm^{-1}$. The correlation coefficient ($R^2$) of the resulting calibration curve must be a minimum of 0.95.

A Raman spectrum of the unknown insert material is obtained using this instrument at the point of interest in the unknown sample (e.g., surface or center of the golf club insert). The unknown must be free of foreign matter, such as mold release, etc. Analyze the spectrum of the unknown using the PLS calibration curve to determine trans-polybutadiene isomer content of the unknown sample.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 1,1-bis(t-butylperoxy)-3,3,5 -trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The free radical source may alternatively or additionally be one or more of an electron beam, WV or gamma radiation, x-rays, or any other high energy radiation source capable of generating free radicals. It should be further understood that heat often facilitates initiation of the generation of free radicals when peroxides are used as a free-radical initiator.

Crosslinking agents are optionally included to increase the hardness of the reaction product. Suitable crosslinking agents include one or more metallic salts of unsaturated fatty acids or monocarboxylic acids, such as zinc, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent, when included, must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 of the resilient polymer component, preferably from about 10 to 40 percent of the resilient polymer component, more preferably from about 20 to 40 percent of the resilient polymer component. When only an organosulfur is used as the cis-to-trans catalyst, zinc diacrylate may be selected as the crosslinking agent and is present in an amount of less than about 25 phr.

Fillers optionally but preferably added to one or more portions of the insert typically include processing aids or compounds to affect rheological and mixing properties, the specific gravity (i.e., density-modifying fillers), the modulus, the tear strength, reinforcement, and the like. Any suitable filler available to one of ordinary skill in the art may be used. Preferably, the fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include used, ground rubber particles and/or various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers, when typically included, are present in an amount from about 0.1 to about 50 phr, preferably from about 0.1 to about 10 phr, and more preferably from about 0.1 to about 5 phr. as fillers tend to reduce resilience of the reaction product, it is generally preferred to use less fillers rather than more.

The resilient polymer component used to form the insert may also include a minority amount of one or more polymers in addition to the polybutadiene, such as a thermoplastic copolyesterester block copolymer, dynamically vulcanized thermoplastic elastomer, hydrogenated or non-hydrogenated styrene-butadiene elastomer with functional groups such as maleic anhydride or sulfonic acid attached, thermoplastic polyurethane or polymers made using a metallocene catalyst, or blends thereof. Suitable thermoplastic copolyetheresters include HYTREL® 3078 and HYTREL® 4069, which are commercially available from E. I. DuPont de Nemours & Co. of Wilmington, Del. Suitable dynamically vulcanized thermoplastic elastomers include SANTOPRENE®, commercially available from Advanced Elastomer Systems of Akron, Ohio. Examples of suitable functionalized styrene-butadiene elastomers, include KRATON® FG-1901x and FG-1921x, which are available from the Shell Corporation of Houston, Tex. Examples of suitable thermoplastic polyurethanes include ESTANE® 58133 and ESTANE® 58144, which are commercially available from the B. F. Goodrich Company of Cleveland, Ohio. Further, the materials for the golf club insert described above may be in the form of a foamed polymeric material. For example, suitable metallocene polymers include foams of thermoplastic elastomers based on metallocene single-site catalyst-based foams. Suitable thermoplastic polyetheramides include PEBAX® 2533, PEBAX® 1205 and PEBAX® 4033 which are available from Elf-Atochem of Philadelphia, Pa. Suitable thermoplastic ionomer resins include any number of olefinic based ionomers including SURLYN® and IOTEK®, which are commercially available from E. I. DuPont de Nemours & Co. of Wilmington, Del., and Exxon Corporation of Irving, Tex., respectively. When the resilient polymer component includes any additional polymers in addition to polybutadiene, polybutadiene will be present in at least 50 phr of the resilient polymer component, as noted herein.

The resilient polymer component, crosslinking agent, free-radical initiator, filler(s), and any other materials used in forming the golf club insert, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf club insert, may similarly be combined by any type of mixing. A single-pass mixing process where ingredients are added sequentially is preferred, as this type of mixing tends to increase efficiency and reduce costs for the process. The preferred mixing cycle is a single step wherein the resilient polymer, including polybutadiene, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds for combining polymers are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component The speed should thus be low enough to avoid high shear, which may result in loss of desirably high molecular weight portions of the polymer component. Also, too high a mixing speed may undesirably result in creation of enough heat to initiate the crosslinking. The mixing temperature depends upon the type of polymer components, and more importantly, on the type of free-radical initiator. For example, when using di(2-t-butyl-peroxyisopropyl)benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed about 95° C. Suitable mixing speeds and temperatures are well-known to those of ordinary skill in the art, or may be readily determined without undue experimentation.

The mixture can be subjected to, e.g., a compression or injection molding process, to obtain the desired shape of the golf club inserts. The polymer mixture is subjected to a molding cycle in which heat and pressure are applied while the mixture is confined within a mold. The cavity shape depends on the predetermined geometric shape of the insert of the present invention. The compression and heat liberates free radicals by decomposing one or more peroxides, which may initiate the cis-to-trans conversion and crosslinking simultaneously. The temperature and duration of the molding cycle are selected based primarily upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 340° F. for a duration of 15 min. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 min, then ramping the mold to 340° F. where it is held for a duration of 20 min. In a preferred embodiment of the current invention, a single-step cure cycle is employed. Single-step processes are effective and efficient, reducing the time and cost of a two-step process.

The cured resilient polymer component, which contains a greater amount of trans-polybutadiene isomer than the uncured resilient polymer component, can be formed into an article having a first hardness at a point in the interior and a surface having a second hardness such that the second hardness differs from the first hardness by greater than about 5 percent of the first hardness. Preferably, the article is substantially a rectangle and the point is the midpoint of the article. In another embodiment, the second hardness differs from the first by greater than 10 percent of the first hardness. The cured article can also have a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably the midpoint and the article is preferably a rectangle.

Depending on the desired properties, inserts prepared according to the invention can exhibit substantially the same or higher resilience with a decrease in modulus compared to conventional polybutadiene formulations. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf club insert is converted to dynamic energy. The rigidity or compressive stiffness of an insert may be measured, for example, by the dynamic stiffness. A higher dynamic stiffness indicates a higher compressive stiffness. To produce inserts having a desirable compressive stiffness, the dynamic stiffness of the crosslinked reaction product material can be less than about 50,000 N/m at −50° C. In one preferred embodiment, the dynamic stiffness can be between about 10,000 and 40,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf club insert. In one embodiment, the polybutadiene reaction product preferably has a loss tangent below about 0.1 at −50° C., and more preferably below about 0.07 at −50° C.

The golf club insert polybutadiene material of the present invention typically has a flexural modulus of from about 500 psi to 300,000 psi, preferably from about 2000 to 200,000 psi. Flexural modulus is measured according to ASTM D 6272-98. The golf club insert polybutadiene material typically has a hardness of at least about 15 Shore A, preferably between about 30 Shore A and 80 Shore D, more preferably between about 50 Shore A and 60 Shore D. The specific gravity is typically greater than about 0.5, preferably from about 0.5 to 5, more preferably from about 0.7 to about 5, for the insert polybutadiene material. In one embodiment, the specific gravity is about 1. The dynamic shear storage modulus, or storage modulus, of the insert polybutadiene material, at about 23° C., is typically at least about 10,000 dyn/cm$^2$, preferably from about 10$^4$–10$^{10}$ dyn/cm$^2$, more preferably from about 10$^6$ to 10$^{10}$ dyn/cm$^2$.

Additionally, the unvulcanized polybutadiene in golf club inserts prepared according to the invention typically has a Mooney viscosity greater than about 20, preferably greater than about 30, and more preferably greater than about 40. Mooney viscosity is typically measured according to ASTM D-1646.

It should be understood that one of ordinary skill in the art can prepare any size or shape of insert in accordance with the present invention, and attach the insert to any type of club. For example, a substantially rectangular shaped insert can be prepared, preferably rectangular. "Substantially rectangular" means a shape that will fill a significant portion of the striking face of a club. Preferably, the club is an iron or a putter. More preferably, the club containing the insert is a putter. It should also be understood by one of ordinary skill in the art that multiple inserts can be used in a club, so long as at least one such insert is prepared according to the present invention.

Figure 2:
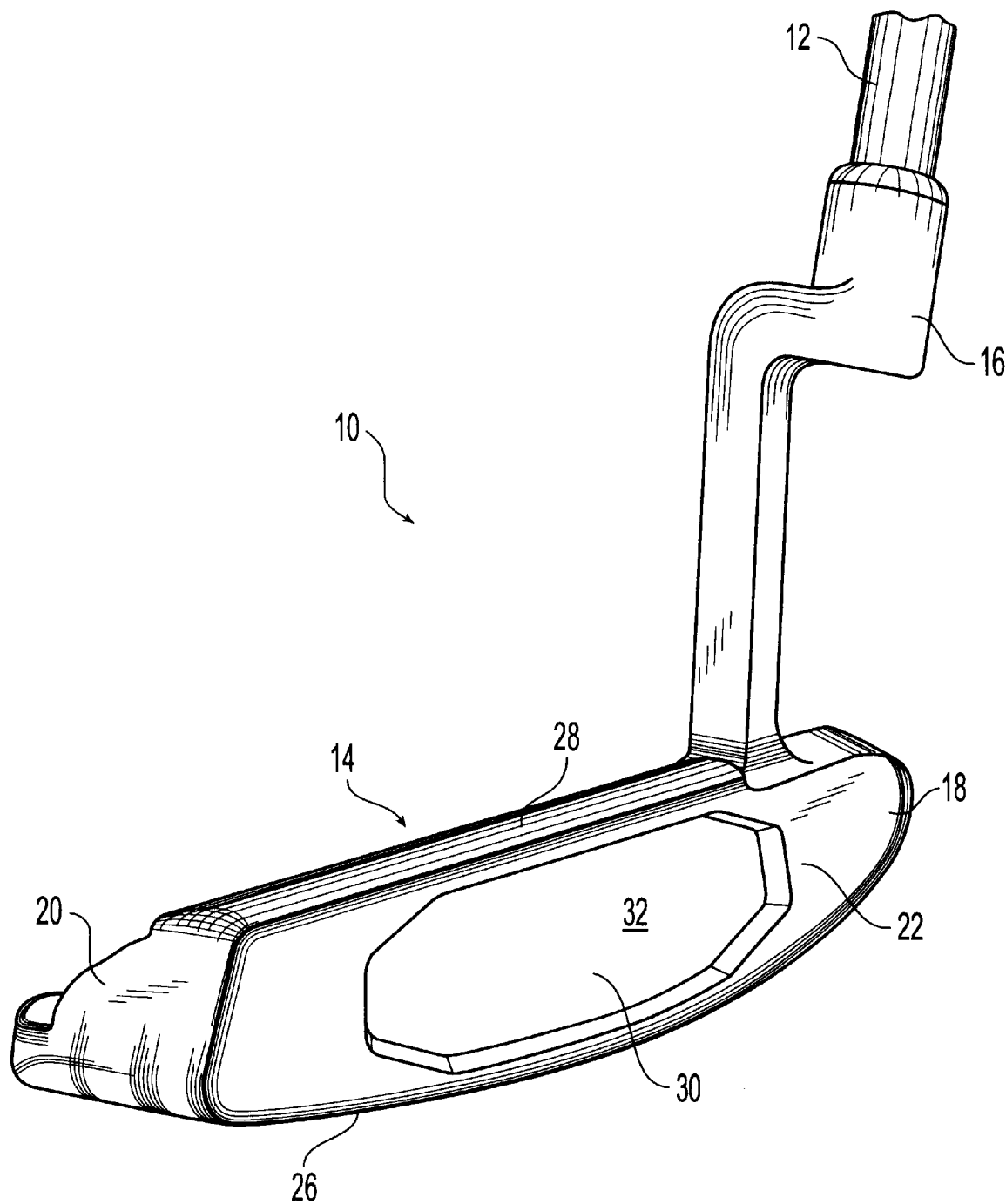
FIG. 2 is a perspective view of a club head according to the present invention showing a cavity for receiving the polybutadiene reaction product.

According to the present invention and referring to FIGS. 1 and 2, a golf club 10 has a shaft 12 (only partially shown) attached to a club head 14. A putter-type club head is shown in FIGS. 1 and 2, however, as explained herein, other club head types, such as irons or woods, may also be prepared according to the present invention.

The club head 14 has a hosel 16 that accepts the shaft 12 with a heel 18 at the hosel end of the club head 14 and a toe 20 opposite of the heel 18. The club head 14 also has a sole portion 26 and an opposite top portion 28. Extending between the heel 14 and the toe 20 is a strike face 22, which is the surface that contacts the golf ball (not shown) upon impact between the golf club 10 and the ball. The strike face 22 includes a "sweet spot," or the center of gravity in the toe to heel direction, which is covered with an insert 24. The insert 24 is made of a material that is different than the rest of the club head. In the preferred embodiment, the insert is made of a polybutadiene reaction product formed from the reaction of an amount of polybutadiene, a free radical source, and a cis-to-trans catalyst, at a sufficient reaction temperature to convert a portion of cis-isomer to trans-isomer polybutadiene, thereby increasing the amount of trans-isomer polybutadiene present in the reaction product relative to the polybutadiene starting material.

Figure 3:
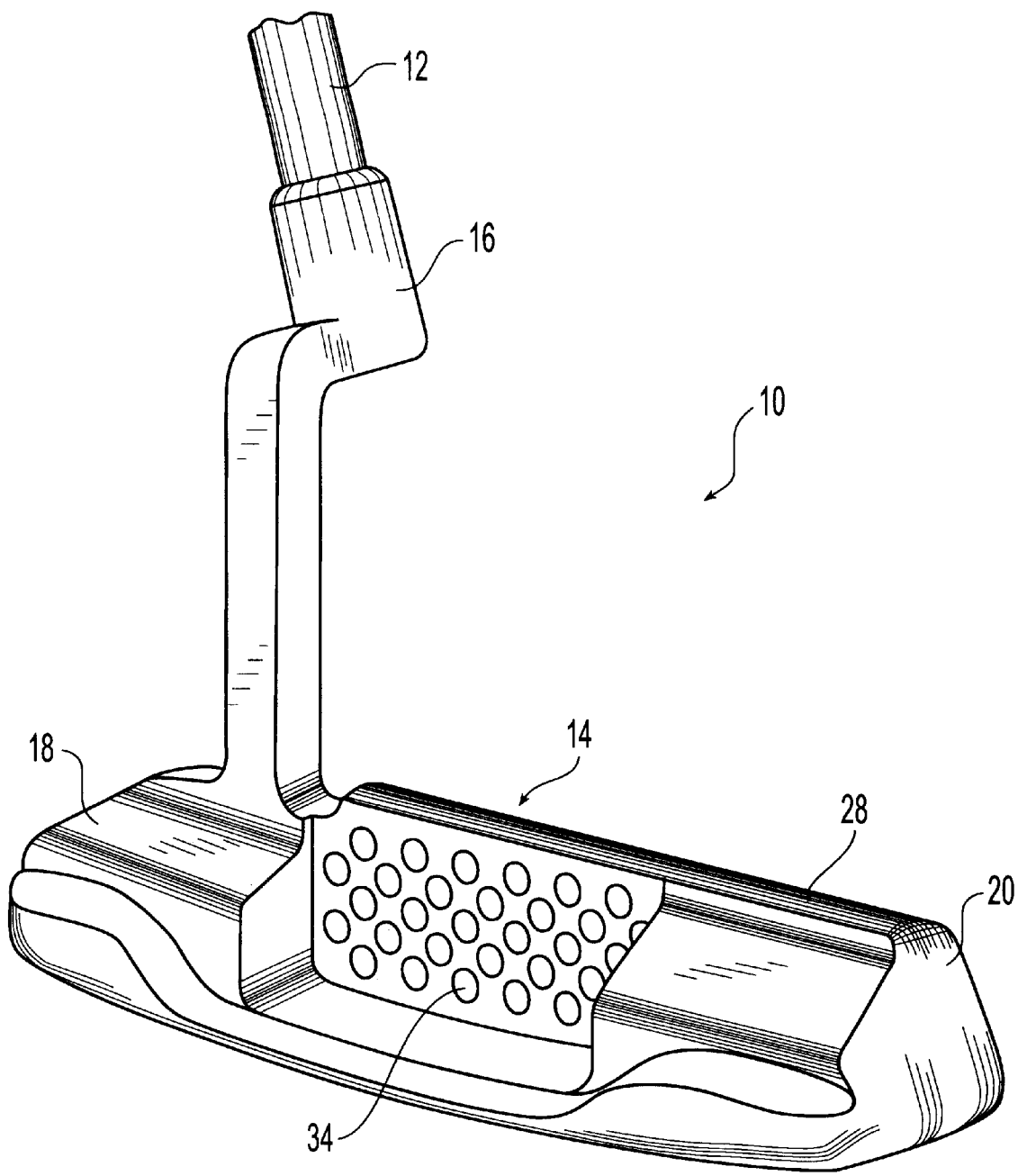
FIG. 3 is a perspective view of an alternative embodiment of the club head of the present invention depicting apertures through the cavity bottom surface.

The insert 24 is typically contained in a recess 30 in the strike face 22. The insert 24 may be secured within the recess 30 by a variety of means, such as by adhesion or friction. It is preferred, however, that the insert 24 is secured by press fitting. The insert 24 can have a back face that is in contact with, and adjacent to, a recessed bottom surface 32. Referring to FIG. 3, in an alternative embodiment, the recessed bottom surface 32 contains a plurality of apertures 34 for receiving a damping material, such as an elastomeric material or the polybutadiene reaction product of the invention. Additionally, the apertures 34 may also receive the polybutadiene reaction product for additional securing of the insert 24. The "touch and the feel" of the putter may be altered by varying the amount of elastomeric material and/or polybutadiene reaction product located in the bottom surface 32.

Figure 4:
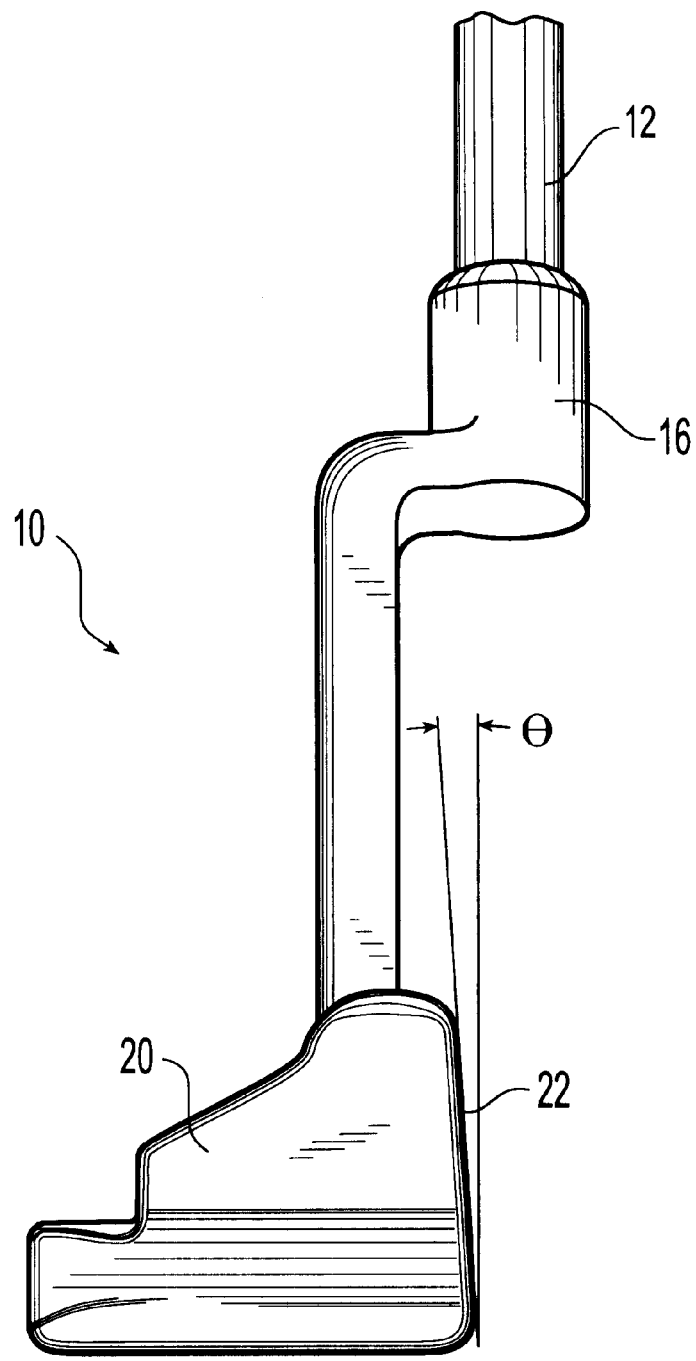
FIG. 4 is a front view of a club head according to the present invention showing the loft angle of a putter.

The insert 24 is preferably axially aligned with the club head strike face 22. Referring to FIG. 4, the strike face can have a loft angle, θ, which is defined as the angle between the plane of the club face and a plane perpendicular to the ground. For a standard lofted putter, the loft angle is approximately 4 degrees.

EXAMPLES

A variety of metal sulfide cis-to-trans catalysts that successfully converted a portion of the cis-polybutadiene isomer to the trans-isomer are presented in Table 1. CARIFLEX BR-1220 polybutadiene (100 phr) was reacted with zinc oxide (5 phr), dicumyl peroxide (3 phr, the free radical initiator), and zinc diacrylate (25 phr), to form the reaction product as described in the present invention.

Trans-isomer conversion percentages range from below 6 percent to above 16 percent for the various catalysts that are present in amounts ranging from below 2 phr to above 5 phr. The table clearly demonstrates the effectiveness of numerous different cis-to-trans catalysts, at varying concentrations, for increasing the trans-polybutadiene content.

The amount of vibration dampening material in the club head can be varied in a number of ways. For example, the geometry of the peripheral groove can be varied by changing the width w, the depth D, the geometry, or by changing the size of the optional gap.

Varying the amount of vibration dampening material affects the feel of the club head and allows the club head to be custom fit to a particular player or group of players depending on their needs, preferences, and/or desired performance characteristics. If a player, such as a PGA Tour player, prefers more robust contact between the insert and recess bottom surface, the amount of vibration dampening material can be decreased. If as a group, ladies, seniors or juniors, for example, prefer more forgiving contact between the insert and recess bottom surface, the amount of vibration dampening material can be increased. Thus, the club head of the present invention allows the manufacturer to modify the club head to satisfy one player or a group of players, which is advantageous.

For example, a typical mixture includes about 100 phr of a low-vinyl-containing polymer, such as low-vinyl polybutadiene, about 0.01 to 5 phr of a cis-to-trans catalyst, such as 4,4'-ditolyl disulfide, about 0.1 to 50 phr of an organic peroxide, such as dicumyl peroxide, about 1 to 50 phr of a metal salt, such as zinc diacrylate ("ZDA"), and about 0.1 to 50 phr of a density-modifying filler, such as zinc oxide ("ZnO"). A preferred mixture comprises about 100 phr low-vinyl polybutadiene, about 30 phr ZDA, about 5 phr ZnO, about 2 phr dicumyl peroxide, and about 2 phr DTDS.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims if any.

an insert located in the recess formed of a first vibration dampening material comprising an insert material formed from the conversion reaction of a resilient polymer having sufficient amounts of polybutadiene, a free radical source, and a cis-to-trans catalyst, which reaction occurs at a sufficient temperature to form a polybutadiene reaction product which comprises an amount of trans-polybutadiene isomer greater than the amount of trans-polybutadiene isomer present before the conversion reaction.

2. The golf club of claim 1, wherein the insert material has a first dynamic stiffness measured at −50° C. that is less than about 130 percent of a second dynamic stiffness measured at 0° C.

3. The golf club of claim 1, wherein the insert has a midpoint having a first amount of trans-polybutadiene and a surface having a second amount of trans-polybutadiene, wherein the first amount is at least about 6 percent less than the second amount.

4. The golf club of claim 1, wherein the cis-to-trans catalyst comprises a Group VIA element, an inorganic sulfur compound, an organosulfur compound, an aromatic organometallic compound, a metal-organosulfur compound, or an aromatic organic compound, or a combination thereof.

5. The golf club of claim 1, wherein the cis-to-trans catalyst comprises a Group VIA element, an organosulfur component, an inorganic sulfide, or a combination thereof.

6. The golf club of claim 1, wherein the cis-to-trans catalyst is present in an amount from about 0.01 to about 25 parts per hundred of resilient polymer.

7. The golf club of claim 6, wherein the cis-to-trans catalyst is present in an amount from about 0.01 to about 5 parts per hundred of polybutadiene.

TABLE 1

Metal Sulfide Conversion Examples

| | | | | | | | | | | | | | |
|---|---|---|---|---|---|---|---|---|---|---|---|---|---|
| Polybutadiene (CARIFLEX ® 1220) | 100 | 100 | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| cis-trans "catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

What is claimed is:

1. A golf club having a toe and an opposite heel, a sole portion and an opposite top portion, a forwardly facing exposed strike face, an opposite rearwardly facing exposed back face portion, a hosel, and a shaft, comprising:
   a recess defined in the strike face, said recess having at least a bottom surface spaced from the back face portion and a side wall surface extending between the bottom surface and the strike face; and 8. The golf club of claim 1, wherein the insert material comprises less than about 7 percent vinyl isomer content based on the total polybutadiene.

9. The golf club of claim 8, wherein the insert material comprises less than about 4 percent vinyl isomer.

10. The golf club of claim 9, wherein the insert material comprises less than about 2 percent vinyl isomer.

11. The golf club of claim 1, further including a plurality of apertures extending from said back face portion toward the recess and a second vibration dampening material located in at least one of the apertures.

12. The golf club of claim 10, wherein the insert further comprises a back face and the back face is spaced from said bottom surface of the recess to define a gap.

13. The golf club of claim 12, farther comprising a second vibration dampening material located within the gap.

14. The golf club of claim 13, wherein the second vibration material is disposed within all of the apertures.

15. The golf club of claim 14, wherein the second vibration dampening material comprises the insert material.

16. A golf club insert comprising an insert material formed from the conversion reaction of a sufficient amount of a resilient polymer including polybutadiene, a free radical source, and a cis-to-trans catalyst, which reaction occurs at a sufficient temperature to form a polybutadiene reaction product which comprises an amount of trans-polybutadiene greater than the amount of trans-polybutadiene present before the conversion reaction.

17. The insert of claim 16, wherein the insert material has a first dynamic stiffness measured at −50° C. that is less than about 130 percent of a second dynamic stiffness measured at 0° C.

18. The insert of claim 16, wherein the insert has a midpoint having a first amount of trans-polybutadiene and a surface having a second amount of trans-polybutadiene, wherein the first amount is at least about 6 percent less than the second amount.

19. The insert of claim 16, wherein the cis-to-trans catalyst comprises a Group VIA element, an inorganic sulfur compound, an organosulfur compound, an aromatic organometallic compound, a metal-organosulfur compound an aromatic organic compound, or a combination thereof.

20. The insert of claim 16, wherein the cis-to-trans catalyst comprises a Group VIA element, an organosulfur component, an inorganic sulfide, or a combination thereof.

21. The insert of claim 20, wherein the cis-to-trans catalyst is 4,4'-ditolyl disulfide.

22. The insert of claim 16, wherein the cis-to-trans catalyst is present in an amount from about 0.01 to about 25 parts per hundred of resilience polymer.

23. The insert of claim 22, wherein the cis-to-trans catalyst is present in an amount from about 0.01 to 3 parts per hundred of reaction product.

24. The insert of claim 16, wherein the insert material comprises less than about 7 percent vinyl isomer content based on the total polybutadiene.

25. The insert of claim 24, wherein the insert material comprises less than about 4 percent vinyl isomer.

26. The insert of claim 25, wherein the insert material comprises less than about 2 percent vinyl isomer.

27. A method for forming a golf club insert which comprises:

combining a cis-to-trans catalyst; a free radical source; and a first resilient polymer component comprising a polybutadiene component having cis-isomer present in an amount greater than about 70 percent of the total polymer component;

converting a portion of the first resilient polymer component to a second resilient polymer component at a temperature sufficient to convert at least a portion of the cis-polybutadiene isomer to a trans-polybutadiene isomer; and forming the second resilient polymer component into at least a portion of the golf club insert.

28. The method of claim 27, wherein the portion of the second resilient polymer component is formed into a substantially rectangular shape.

29. The method of claim 27, wherein the portion of the second resilient polymer component is formed by molding the insert in situ on a golf club.

30. The method of claim 27, wherein the polybutadiene component comprises a cis-polybutadiene isomer present in an amount of at least about 80 percent of the total first resilient polymer component.

31. The method of claim 27, further comprising combining a density-modifying filler, a crosslinking agent, or both.

32. The method of claim 27, wherein the insert has a midpoint having a first amount of trans-polybutadiene and a surface having a second amount of trans-polybutadiene, wherein the first amount is at least about 7 percent less than the second amount.

33. The method of claim 27, wherein the second amount of trans-polybutadiene component comprises a vinyl polybutadiene component present in an amount of less than about 7 percent of the total resilient polymer component.

34. The method of claim 27, wherein the cis-to-trans catalyst comprises a Group VIA element, an inorganic sulfur compound, an organosulfur compound, an aromatic organometallic compound, a metal-organosulfur compound, an aromatic organic compound, or a combination thereof.

35. The method of claim 27, wherein the cis-to-trans catalyst comprises a Group VIA element, an organosulfur, an inorganic sulfide, or a combination thereof.

36. The method of claim 27, wherein the cis-to-trans catalyst comprises 4,4'-ditolyl disulfide.

37. The method of claim 27, wherein the cis-to-trans catalyst is present in an amount from about 0.01 to about 25 parts per hundred of the total resilient polymer component.

38. The method of claim 37, wherein the cis-to-trans catalyst is present in an amount from about 0.01 to about 15 parts per hundred of the total resilient polymer component.

39. The method of claim 38, wherein the cis-to-trans catalyst is present in an amount from about 0.05 to about 5 parts per hundred of the total resilient polymer component.

40. The method of claim 27, wherein the converting takes about 2 to 18 min.

41. The method of claim 27, wherein the converting comprises a single-step compression molding of the first resilient polymer component to convert the first resilient polymer component to the second resilient polymer in about 3 to 15 minutes; and the forming comprises shaping the second resilient polymer component into a substantially rectangular shape.

42. The method of claim 41, wherein the converting and forming are substantially simultaneous.

* * * * *